United States Patent
Ng

(10) Patent No.: US 8,750,942 B1
(45) Date of Patent: *Jun. 10, 2014

(54) HEAD UNIT TO HANDSET INTERFACE AND INTEGRATION

(71) Applicant: Sprint Communications Company L.P., Overland Park, KS (US)

(72) Inventor: Sei Y. Ng, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/971,658

(22) Filed: Aug. 20, 2013

Related U.S. Application Data

(63) Continuation of application No. 13/246,554, filed on Sep. 27, 2011, now Pat. No. 8,548,532.

(51) Int. Cl.
*H04M 1/00* (2006.01)

(52) U.S. Cl.
USPC ............ 455/569.1; 455/420; 455/550.1; 455/557; 701/418; 701/419; 381/300; 381/302

(58) Field of Classification Search
USPC ............ 455/3.06, 418, 419, 420, 152.1, 41.2, 455/550.1, 556.2, 569.1, 557; 701/36, 418, 701/419, 428, 429; 381/300, 302
See application file for complete search history.

(56) References Cited

U.S. PATENT DOCUMENTS

| | | | |
|---|---|---|---|
| 6,622,083 B1 | 9/2003 | Knockeart et al. | |
| 7,209,964 B2 | 4/2007 | Dugan et al. | |
| 7,366,892 B2 | 4/2008 | Spaur et al. | |
| 7,376,392 B2 | 5/2008 | Myojo | |
| 7,454,473 B2 | 11/2008 | Suzuki | |
| 7,912,224 B2 | 3/2011 | Lee et al. | |
| 7,966,111 B2 | 6/2011 | Moinzadeh et al. | |
| 8,484,707 B1 | 7/2013 | Bertz et al. | |
| 8,498,657 B1 | 7/2013 | Delker et al. | |
| 8,548,532 B1 | 10/2013 | Ng | |
| 8,630,747 B2 | 1/2014 | Burcham et al. | |
| 2003/0096641 A1 | 5/2003 | Odinak | |
| 2003/0120601 A1 | 6/2003 | Ouye et al. | |
| 2004/0125957 A1 | 7/2004 | Rauber et al. | |
| 2005/0021744 A1 | 1/2005 | Haitsuka et al. | |

(Continued)

FOREIGN PATENT DOCUMENTS

| | | |
|---|---|---|
| JP | 20062441 A | 9/2006 |
| WO | 2013166418 A2 | 11/2013 |
| WO | 2013173331 A1 | 11/2013 |

OTHER PUBLICATIONS

First Action Interview Pre-Communication dated Aug. 21, 2012, U.S. Appl. No. 13/218,503, filed Aug. 26, 2011.

(Continued)

*Primary Examiner* — Mahendra Patel
*Assistant Examiner* — Babar Sarwar

(57) ABSTRACT

A method of communicatively coupling a handheld mobile device and a head unit comprising monitoring, by the handheld mobile device, a port of the handheld mobile device; sending, by the handheld mobile device, an application to the head unit when the head unit device contacts the handheld mobile device via the port of the handheld mobile device; and conducting, by the handheld mobile device, an operation of the handheld mobile device, using the head unit device as the user interface for the handheld mobile device.

20 Claims, 8 Drawing Sheets

(56) References Cited

U.S. PATENT DOCUMENTS

| | | | |
|---|---|---|---|
| 2005/0065779 A1 | 3/2005 | Odinak | |
| 2005/0113102 A1 | 5/2005 | Kwon et al. | |
| 2007/0113269 A1 | 5/2007 | Zhang | |
| 2007/0124043 A1 | 5/2007 | Ayoub et al. | |
| 2007/0124045 A1 | 5/2007 | Ayoub et al. | |
| 2007/0124046 A1 | 5/2007 | Ayoub et al. | |
| 2007/0160199 A1 | 7/2007 | Sekiguchi et al. | |
| 2008/0034126 A1 | 2/2008 | Baker | |
| 2008/0072047 A1 | 3/2008 | Sarikaya et al. | |
| 2008/0148374 A1 | 6/2008 | Spaur et al. | |
| 2008/0307086 A1 | 12/2008 | Brooks et al. | |
| 2009/0028082 A1 | 1/2009 | Wynn et al. | |
| 2009/0049119 A1 | 2/2009 | Marcinkiewicz et al. | |
| 2009/0109941 A1 | 4/2009 | Carter | |
| 2009/0217036 A1 | 8/2009 | Irwin et al. | |
| 2010/0097239 A1 | 4/2010 | Campbell et al. | |
| 2010/0197362 A1 | 8/2010 | Saitoh et al. | |
| 2010/0220250 A1* | 9/2010 | Vanderwall et al. | 348/837 |
| 2010/0235285 A1 | 9/2010 | Hoffberg | |
| 2010/0260350 A1 | 10/2010 | Chutorash et al. | |
| 2011/0099316 A1 | 4/2011 | Tseng et al. | |
| 2011/0257973 A1 | 10/2011 | Chutorash et al. | |
| 2011/0263293 A1 | 10/2011 | Blake et al. | |
| 2011/0295444 A1 | 12/2011 | Westra et al. | |
| 2011/0310731 A1 | 12/2011 | Park et al. | |
| 2012/0109406 A1 | 5/2012 | Yousefi et al. | |
| 2012/0134497 A1 | 5/2012 | Roitshtein et al. | |
| 2012/0183221 A1* | 7/2012 | Alasry et al. | 382/181 |
| 2012/0203557 A1 | 8/2012 | Odinak | |
| 2012/0282895 A1 | 11/2012 | Bai et al. | |
| 2013/0297456 A1 | 11/2013 | Annan et al. | |

OTHER PUBLICATIONS

First Action Interview Office Action dated Jan. 3, 2013, U.S. Appl. No. 13/218,503, filed Aug. 26, 2011.
Final Office Action dated May 7, 2013, U.S. Appl. No. 13/218,503, filed Aug. 26, 2011.
Advisory Action dated Aug. 1, 2013, U.S. Appl. No. 13/218,503, filed Aug. 26, 2011.
First Action Interview Pre-Interview Communication dated Oct. 26, 2012, U.S. Appl. No. 13/156,438, filed Jun. 9, 2011.
Notice of Allowance dated Feb. 26, 2013, U.S. Appl. No. 13/156,438, filed Jun. 9, 2011.
First Action Interview Pre-Communication dated Jan. 31, 2012, U.S. Appl. No. 13/246,554, filed Sep. 27, 2011.
FAIPP Office Action dated May 21, 2012, U.S. Appl. No. 13/246,554, filed Sep. 27, 2011.
Final Office Action dated Sep. 5, 2012, U.S. Appl. No. 13/246,554, filed Sep. 27, 2011.
Advisory Action dated Nov. 2, 2012, U.S. Appl. No. 13/246,554, filed Sep. 27, 2011.
Office Action dated Dec. 5, 2012, U.S. Appl. No. 13/246,554, filed Sep. 27, 2011.
Notice of Allowance dated May 20, 2013, U.S. Appl. No. 13/246,554, filed Sep. 27, 2011.
Office Action dated Mar. 13, 2013, U.S. Appl. No. 13/471,107, filed May 14, 2012.
Notice of Allowance dated Aug. 26, 2013, U.S. Appl. No. 13/471,107, filed May 14, 2012.
Aboda, B., et al., "Exentsible Authentication Protocol (EAP)", Network Working Group, RFC 3748, Standards Track, Jun. 2004.
Shipley, Trevor D., et al. Patent Application entitled "Mobile Communication System Identity Pairing," filed Aug. 26, 2011, U.S. Appl. No. 13/218,503.
Bertz, Lyle T., et al., Patent Application entitled "Secure Changing Auto-Generated Keys for Wireless Access," filed Jun. 9, 2011, U.S. Appl. No. 13/156,438.
Ng, Sei Y., Patent Application entitled "Head Unit to Handset Interface and Integration," filed Sep. 27, 2011, U.S. Appl. No. 13/246,554.
Bertz, Lyle T., et al. Patent Application entitled "Automotive Multi-Generation Connectivity," filed Apr. 26, 2011, U.S. Appl. No. 13/094,494.
Annan, Brandon C., et al. Patent Application entitled "Methods and Systems of Digital Rights Management for Vehicles," filed May 3, 2012, U.S. Appl. No. 13/463,799.
Burcham, Robert H., et al. Patent Application entitled "In-car Head unit Wireless Communication Service Subscription Initialization," filed Apr. 24, 2012, U.S. Appl. No. 13/455,121.
Burcham, Robert H., et al. Patent Application entitled "Alternative Authorization for Telematics," filed May 14, 2012, U.S. Appl. No. 13/471,107.
Bloomcamp, Eric Michael, et al. Patent Application entitled "Dual Path In-Vehicle Communication," filed Feb. 15, 2012, U.S. Appl. No. 13/769,268.
Bonn, Michael J., et al. Patent Application entitled "System and Method of Utilizing Driving Profiles via a Mobile Device," filed Mar. 15, 2012, U.S. Appl. No. 13/844,226.
Bloomcamp, Eric M., et al., Patent Application entitled Authenticating Mobile Device for On Board Diagnostic System Access, filed Sep. 23, 2013, U.S. Appl. No. 14/034,475.
Foreign Communication From a Related Counterpart Application, International Search Report and Written Opinion dated Dec. 23, 2013, International Application No. PCT/US13/39514 filed on May 3, 2013.

* cited by examiner

HEAD UNIT TO HANDSET INTERFACE AND INTEGRATION

CROSS-REFERENCE TO RELATED APPLICATIONS

This application is a continuation of and claims priority under 35 U.S.C. §120 to U.S. patent application Ser. No. 13/246,554, filed on Sep. 27, 2011, entitled "Head Unit to Handset Interface and Integration," by Sei Y. Ng, which is incorporated herein by reference for all purposes. This application includes subject matter related to the following application, which is hereby incorporated by reference in its entirety: U.S. patent application Ser. No. 12/483,135, filed Jun. 11, 2009, entitled "User Interface Update Signaling," by Jason R. Delker, et al.

STATEMENT REGARDING FEDERALLY SPONSORED RESEARCH OR DEVELOPMENT

Not applicable.

REFERENCE TO A MICROFICHE APPENDIX

Not applicable.

BACKGROUND

A user of a mobile device may link his/her mobile device to another mobile device, in order to share some of the features of the mobile devices. There are several ways to link mobile devices, such as WiFi and/or other forms of near field communication (NFC). Each method may have pros and cons associated with it.

SUMMARY

In an embodiment, a method of communicatively coupling a handheld mobile device and a head unit device is disclosed. The method comprises initiating a communicative coupling between the handheld mobile device and the head unit device; sending, by the handheld mobile device, an application to a head unit device when the head unit device contacts the handheld mobile device via the port of the handheld mobile device; and conducting, by the handheld mobile device, an operation of the handheld mobile device, using the head unit device as a user interface for the handheld mobile device.

In an embodiment, a system for linking mobile devices is disclosed. The system comprises a base communication device comprising a processor; a transceiver; a memory; an application stored in the memory that is operable to monitor a port of the base communication device, to send a user interface application to a mobile communication device when the mobile communication device contacts the base communication device via the port, and to conduct an operation of the base communication device by the mobile communication device.

In an embodiment, a method for linking mobile devices is disclosed. The method comprises receiving, by a base communication device, a first communication from a mobile communication device; portraying, by the base communication device, the first communication via an input/output device of the base communication device; receiving, by the base communication device, an input from a user; sending, by the base communication device, the user input to the mobile communication device; receiving, by the base communication device, a second communication from the mobile communication device, wherein the second communication is rendered by the mobile communication device, based on the user input; portraying, by the base communication device, the second communication via an I/O device of the base communication device; and accessing, by the base communication device, an asset of the mobile communication device.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

Figure 1:
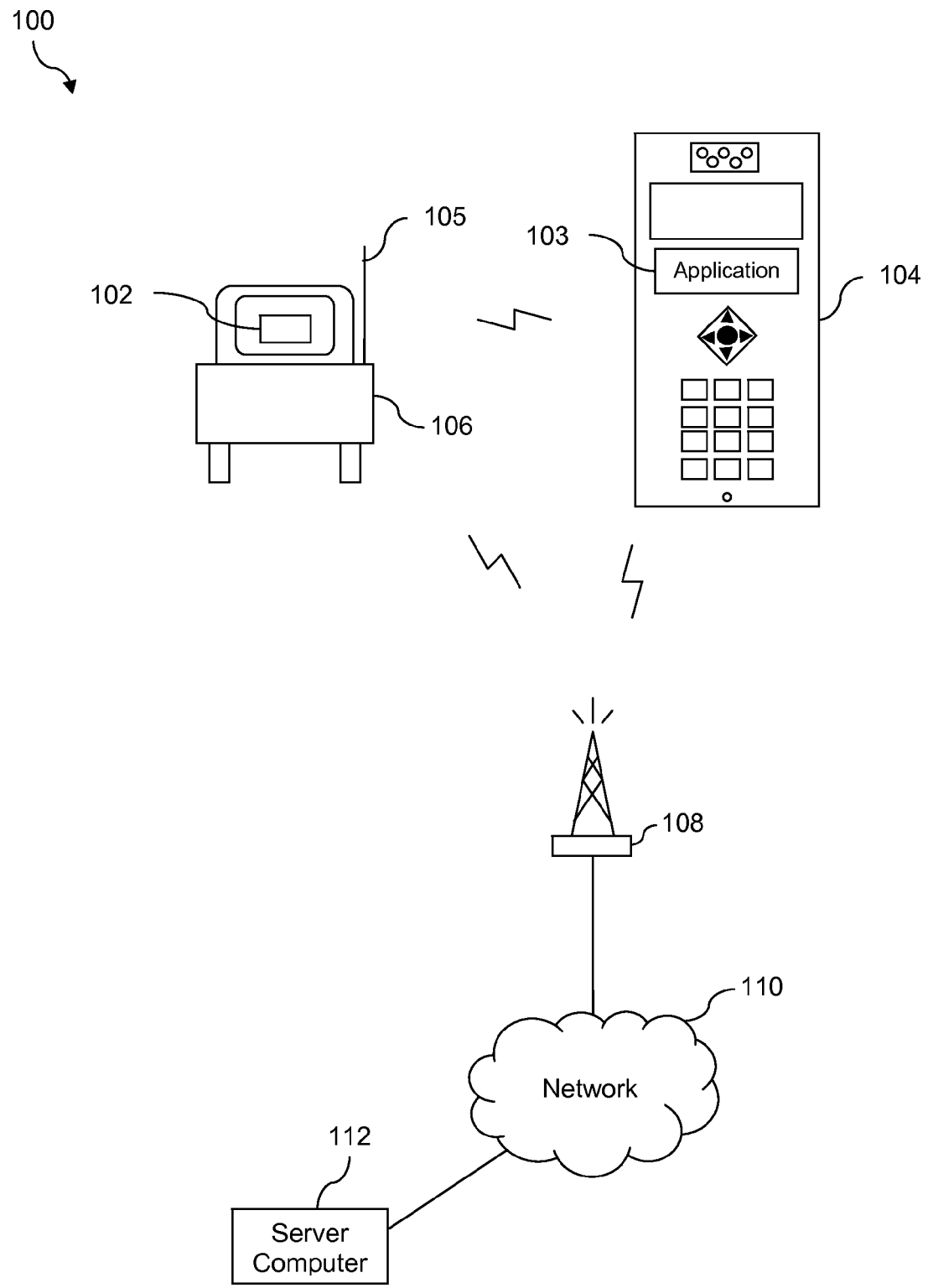
FIG. 1 illustrates a communications system, according to an embodiment of the disclosure.

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

In an embodiment, a system for linking mobile devices is disclosed. The system comprises a method of providing a connection between mobile devices such that a first mobile device may share some of the features, assets, and/or functions of a second mobile device. For example, when communicatively coupled in the manner described herein, a first device may be able to directly access the assets (e.g. contact list or address book) of a second device. In this manner a user of a first device may be able to, for example, call a party by directly accessing contact information that is stored within an address book or contact list of a second device. This may be different from other types of connections between devices such as Bluetooth® technology. As one example of a distinction, traditional Bluetooth® technology permits synchronization of assets such as an address book (e.g. contacts list). This synchronization may be such that a duplicate copy of an asset of one device is formed on the other device, thereby creating duplicate assets. This may be problematic, as one copy may change (e.g. be edited or modified) from time-to-time, thereby rendering the copy obsolete and/or requiring a re-synchronization in order to ensure that the copy is up-to-date. The present disclosure provides a method of directly accessing assets of one device by another, without the need for synchronizing these assets. This avoids the need for duplicating assets, and may therefore provide an improved user experience.

The devices may be, for example, a mobile device such as a mobile phone or a somewhat mobile device such as an automobile head unit. An automobile head unit may be considered a mobile device, in that it is in an automobile, or alternatively it may be thought of as a "stationary" device, in that it may be affixed into the dashboard of the automobile. In the present disclosure, the term "mobile device" should be taken to mean any form of mobile device including but not limited to an automobile head unit.

In an embodiment, the mobile device may be any form of communication device, whether mobile, fixed, installed (e.g. in the dashboard of an automobile), handheld, portable, or such, as may be suitable for a given situation or application. For instance, a user of a mobile phone may be traveling as a passenger in an automobile. The mobile phone user may wish to make a phone call with the mobile phone, but doing so in a moving automobile, given the motion and background noise associated therewith, it may be challenging. In addition, the radio signal to/from the mobile phone may be attenuated by the metal structure of the automobile, which may inhibit effective wireless communications. It may therefore be advantageous to make the call via the head unit of the automobile. This may be because certain features of the head unit may be more convenient to interact with, when riding in an automobile. For example, the display of the head unit may be larger and easier to read than the display of the mobile phone.

Also, the audio system of the head unit may be easier to hear and/or speak through than that of the mobile phone, especially given that there may be a high level of background noise associated with automobile operation. In addition, operation of a larger keypad or touchscreen of the head unit may be an improvement over using that of the mobile phone. The external antenna of the automobile may be accessible to the head unit, and may provide an improved wireless communications signal over that of the mobile phone, especially in light of the signal attenuation effect described herein, above. The user of the mobile phone may link their mobile phone to the head unit of the automobile in a manner that presents the features of the mobile phone on the display of the head unit. The linking may further permit the mobile phone user to interact directly with the head unit to access, for example, the contact list of the mobile phone and/or other assets of the mobile phone, via the head unit, without the need for synchronizing the assets of two units or copying the assets of one to another.

The linking may be accomplished in any suitable manner, but by way of example, it may proceed as follows: a user may prompt the head unit to link to the mobile phone. The head unit may enter a mode wherein it is monitoring a port of the head unit. The head unit may then provide some form of notice or indication that it is in the monitoring mode. When this indication is given, a mobile phone user may prompt the mobile phone to contact the head unit to establish a link. When the mobile phone contacts the head unit, and the head unit acknowledges the contact from the mobile phone, a connection may be established between the two mobile devices—the head unit and the mobile phone. The mobile phone may then send an application to the head unit. The head unit may receive and execute the application. The application may then permit the head unit to, in essence, emulate the mobile phone by providing, for example, a graphical user interface (GUI) that is similar to that of the mobile phone. This may facilitate interaction with the head unit that is analogous in appearance to interacting directly with the mobile phone.

The head unit may emulate the mobile phone by wireless transmitting indicia of the mobile phone (e.g. the identification and authentication information of the mobile phone) such that the wireless communication system (e.g. a base transceiver station with which the mobile phone may be communicatively coupled) may perceive that it is actually directly in contact with the mobile phone, and may not be aware that the indicia of the mobile phone is being presented by a device other than the mobile phone. In this manner, the head unit may be, in effect, invisible to the wireless communication system.

In addition or alternatively, the head unit may have a touch screen or other appurtenances for accepting user input. The head unit may, for example, display a keyboard that resembles the keyboard of the mobile phone on the touchscreen display of the head unit. In an embodiment, the head unit, while executing the application provided by the mobile phone, may present a GUI in the likeness of the mobile phone, and may thereby simplify the user experience of the mobile phone user as he/she interacts with the head unit to perform operations of the mobile phone.

The head unit, while presenting a GUI that resembles the mobile phone, may actually be functioning as something of a "dumb terminal" to the mobile phone. When, for example, a user wants to place a phone call via the head unit, the user may enter the phone number they wish to call via the likeness of the mobile phone provided by the GUI presented on the head unit. A keypad similar to that of the mobile phone may be presented on a touchscreen display of the head unit. The user may touch the appropriate numbers to dial, and the head unit may, via the application, send the information regarding the phone call to the mobile phone. The mobile phone may then place the call, and the mobile phone user may speak and listen to the call via the audio system of the head unit. In this scenario, the mobile phone is acting as the functional component of the operation, and the head unit is acting as the proxy, portal, or dumb terminal for the operation.

In an embodiment, any number or type of operations of mobile devices may be carried out via a link between mobile devices. In an embodiment, each communicatively linked mobile device may perform any/all functions of another communicatively linked mobile device, and each may act as a "dumb terminal" for the other for any of the operations, as may be suitable in a given situation. For example, phone calls, text messages, internet browser sessions, and/or any other operations that the mobile device (e.g. the mobile device that is performing the actual operation), may be carried out via the mobile device that is serving as the dumb terminal, at any given moment, for any particular operation or operations.

Turning now to FIG. 1, a wireless communication system 100 is illustrated. System 100 comprises a first mobile device 102, an application 103, a second mobile device 104, a vehicle 106, a base transceiver station (BTS) 108, a network 110, and a server computer 112. The first mobile device 102 may be installed in, attached to, or otherwise associated with vehicle 106 and may be referred to as head unit 102. In an embodiment, the vehicle 106 may comprise an external antenna 105 coupled to the head unit 102. The network 110 may comprise a public communication network, a private communication network, or a combination thereof. The network 110 may comprise both wireless communication links or network portions and wired communication links or network portions.

Application 103 may be an application configured to permit head unit 102 to emulate or otherwise link with mobile device 104, as will be described in further detail herein below. Second mobile device 104 may be any form of mobile device such as a mobile phone, a personal digital assistant, a wireless handset, or other mobile device, but herein may be described in terms of a mobile phone 104. As such, mobile phone 104 may be configured to connect wirelessly to a network such as network 110 via, for example, BTS 108 or any combination of BTS's, as might be appropriate in a given circumstance. Mobile phone 104 may thereby be availed of access to network 110 and also to server computer 112, each of which may be communicatively coupled to network 110. Vehicle 106 may be any form of vehicle such as a car or truck, or any other form of automobile or vehicle, or may be any other device or conveyance suitable for accommodating a device such as head unit 102.

In an embodiment, a user of mobile phone 104 may be in vehicle 106 and may want to initiate a wireless session with mobile phone 104. A wireless session may be any form of wireless communication session such as a phone call, a multimedia messaging service (MMS) message such as a text message, an internet connection, or other such wireless session. Given the nature of a mobile device, its size and such, it may be difficult to operate in vehicle 106 when vehicle 106 is moving, as in traveling down a road. Normal motion of vehicle 106 may make keyboard usage, touchscreen operation, and/or display visualization difficult. In addition, background noise associated with vehicular movement may inhibit the ability for a user to easily communicate by voice, or to hear the voices of others via a mobile phone such as mobile phone 104. The audio system of head unit 102, however, may provide an improved user experience, with respect to the ability to communicate by voice. For this or any other reason, the user of mobile phone 104 may prefer to conduct the wireless communication session via head unit 102 in vehicle 106. In order to accomplish this, mobile phone 104 may be communicatively linked to head unit 102. Linking may be by any means or technology known to one of ordinary skill in the art. For example, a connection may be established between head unit 102 and mobile phone 104 wirelessly via WiFi, near-field communication (NFC), or any other suitable technology which may permit a wireless connection between two devices such as head unit 102 and mobile phone 104. Alternatively, head unit 102 may be communicatively coupled to mobile phone 104 via a wired connection, such as by a docking station, a plug and socket arrangement, a connecting cable, or other such means of connection between the two units.

In an embodiment, and by way of example, the linking of head unit 102 to mobile phone 104 may proceed as follows: mobile phone 104 may be configured or controllably selected to listen on a port (e.g. monitor a port) of mobile phone 104 in order to detect a link request from another device, such as head unit 102. A port may be, for example, a software port such as a virtual and/or logical data connection that can be used to exchange data directly, such as transmission control protocol (TCP) and/or a user datagram protocol (UDP) ports. Ports of this nature may be used to exchange data between a variety of different devices, and may be suitable for use with data exchange between head unit 102 and mobile phone 104.

When a user of mobile phone 104 wishes to link to head unit 102, he/she may prompt head unit 102 to transmit a signal to mobile phone 104, to initiate a connection with mobile phone 104. The prompting may be done by any means that permits the initiation of a communication link between the two units. For example, a user may select a button or other control within the user interface of head unit 102. Head unit 102 may then, for example, transmit a signal via one of many known technologies to mobile phone 104. Mobile phone 104 may detect the incoming signal on a port that mobile phone 104 is monitoring, and may respond by indicating to head unit 102 that communication between mobile phone 104 and head unit 102 has been established. Mobile phone 104 may then transmit an application, such as application 103, to head unit 102. Head unit 102 may then receive application 103 (e.g. an emulation application or user interface) from mobile phone 104. Head unit 102 may store application 103 in an onboard memory for future use, or alternatively the application may be deleted from memory and transmitted whenever mobile phone 104 wishes to communicatively link to head unit 102. The application 103 may be of any form or fashion (e.g. a web-based phone user interface) and may participate in the link between head unit 102 and mobile phone 104, as well as perform other functions, as will be described in greater detail, below.

In an embodiment, the call-and-response roles described herein above may be reversed. For instance, rather than the mobile phone 104 monitoring a port and the head unit 102 sending a prompting signal to mobile phone 104 to initiate the communicative link, instead the head unit 102 may monitor a port and the mobile phone 104 may send a signal to the head unit 102, in order to initiate the communicative link. In an embodiment, the prompting and/or responding may be accomplished via any suitable means to produce the communicative link between head unit 102 and mobile phone 104.

In an embodiment, the communicative link between the mobile devices may provide some form of security, such as wired equivalent privacy (WEP), 802.11 security, WiFi protected access (WPA), extensible authentication protocol (EAP), or other form of wireless security, in order to protect the information exchange between the devices.

While executing on head unit 102, application 103 may configure head unit 102 to serve as a sort of "proxy", with regard to the operation of mobile phone 104. As used herein, the term proxy describes the act or actions of providing the functions or functionality of mobile phone 104 by head unit 102, such that the operation of mobile phone 104 is conducted via application 103 executing on head unit 102. For example, head unit 102 may, when executing the application discussed herein above, display an image or likeness of mobile phone 104 on the display of head unit 102. Once the link is established, a user may, by operating a keypad or touchscreen of head unit 102, operate mobile phone 104 through head unit 102. The actual operations (e.g. the phone call, text message, web browsing, or other operations) may be conducted by the hardware, software, and/or firmware of mobile phone 104, but the user may interface directly with head unit 102, as facilitated by application 103.

By way of example, while in the process of a phone call, when a user speaks so as to communicate with the caller on the other end of the phone call, the voice signal may be picked up by a microphone coupled to the head unit 102 or to an audio system of vehicle 106. The head unit 102 or the audio system may convert the voice to an electrical signal, and the head unit 102 may transmit the electrical signal via the communicative link to the mobile phone 104, In an embodiment, the electrical signal does not comply with a cellular radio interface protocol and is not encoded in a form that is directly compatible with a cellular radio interface protocol. The mobile phone 104 may reformat, encode, or modulate the information contained in the electrical signal, for example a voice signal, and transmit the encoded signal over a wireless connection with BTS 108, to network 110. The caller on the other end of the phone call may be similarly connected to network 110 by any suitable means, and their mobile phone may receive the signal and in a manner similar to the process described above, convert the signal back to an audible signal at the earpiece of the recipient's mobile phone (or whatever type of communication device they may be using).

When the recipient responds with their voice, the process may repeat substantially in reverse, and their voice may likewise be converted to a signal within their mobile device and sent back to mobile phone 104. The mobile phone 104 may convert the encoding of the voice to a coding that is suitable for transmitting to the head unit 102, for example in a modulation and/or encoding scheme which is not directly compatibly with cellular radio interface protocol, and transmit this signal on to head unit 102, and may then be projected through the audio system of vehicle 106. In this manner, a phone conversation may be conducted with head unit 102 acting as something of a go-between or proxy for mobile phone 104 and the caller on the other end of the phone call. It is understood that the above description of the flow a voice call is provided as an example to promote better understanding of the interactions between the mobile phone 104 and the head unit 102, but that other call sequences and/or communication sequences between the mobile phone 104 and the head unit 102 are also contemplated by the present disclosure.

The user may operate mobile phone 104 via interactions with the "virtual mobile phone" displayed on the display of head unit 102, as if he/she were actually operating mobile phone 104. By virtue of the larger display and more substantial audio system provided by head unit 102, however, the user experience may be improved over that of direct operation of mobile phone 104, especially when in a moving vehicle such as vehicle 106.

When head unit 102 and mobile phone 104 are communicatively linked, the relationship between these two devices may also be described in terms of head unit 102 acting as a "portal" for mobile phone 104. In this description, head unit 102 may port the operations of mobile phone 104 in a manner such that head unit 102 accepts and relays user input from head unit 102 to mobile phone 104. Head unit 102 also may port images and/or information from the display of mobile phone 104 to the display of head unit 102. In this way, an interactive relationship may exist between the two devices, while the functional aspects of the operations are being performed by mobile phone 104.

Figure 2:
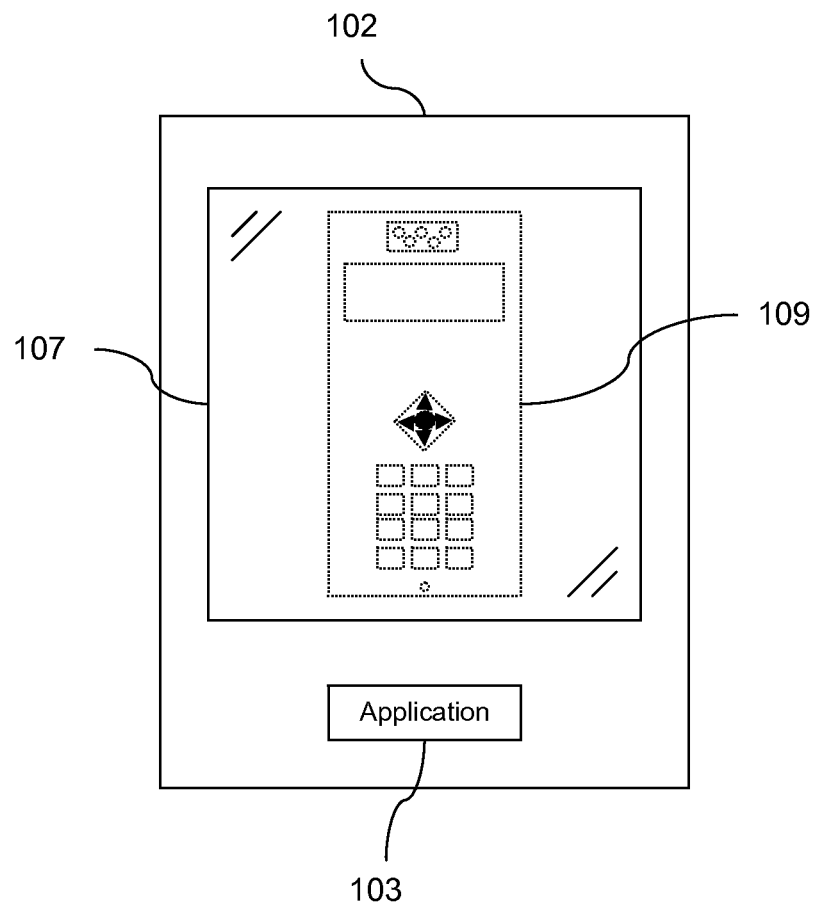
FIG. 2 illustrates a mobile communication device, according to an embodiment of the disclosure.

Turning now to FIG. 2, a head unit 102 is illustrated. Head unit 102 comprises a display 107, and internal systems (not shown) that may include any hardware, software, interconnections, and/or firmware necessary to provide the functionality of a head unit, such as a typical head unit one might find in an automobile. Head unit 102 may be, for example, a computer that is integrated into vehicle 106. Computers are discussed in detail hereinafter. Head unit 102 may be a multifunction computer, and may provide a variety of functions such as a controlling unit and/or interface for accessories of vehicle 106 such as an environmental system (e.g. heating/air conditioning system), an audio system, a global positioning system (GPS), and so on. Head unit 102 may also provide mobile communications capabilities, much like a mobile phone (e.g. mobile device 104). As such, head unit 102 may be capable of sending and/or receiving phone calls, text messages, and the like. Head units of this nature are well known, and will not be described further, herein.

As shown in FIG. 2, a representation of mobile phone 104 may be provided as image 109 on display 107. Display 107 may be a touchscreen display, and as such may accept user input via user interaction directly with the touchscreen, in a manner familiar to those of ordinary skill in the art. In addition, FIG. 2 shows application 103, which by appearing in this figure indicates that application 103 has been sent from mobile phone 104 to head unit 102.

In an embodiment, when head unit 102 is communicatively linked to mobile phone 104 as described herein above, a user may be presented with image 109 of mobile phone 104. When, for example, a user would like to make a phone call, the user may interact with the touch screen to operate the number keys represented on the display 107, as if they were actually operating mobile phone 104. Head unit 102 may then, by execution of application 103, communicate the entered numbers to mobile phone 104. Mobile phone 104 may then, via technology inherent to a typical mobile phone, initiate a phone call. When the phone connection is established, the audio signals received and sent by mobile phone 104 may be communicated to and from head unit 102 such that the audio system of head unit 102 provides the voice interactions of mobile phone 104 via the audio system of head unit 102 (e.g. the audio system of vehicle 106 comprising one or more microphones and one or more speakers). In an embodiment, voice information may be conveyed between communicatively linked devices in a manner commonly referred to as "streaming audio". In a like manner, video or other information may be streamed or otherwise conveyed between head unit 102 and mobile phone 104, or any other communicatively linked devices, in any manner suitable for a given situation, need, desire, or application.

In a manner similar to that described above for a phone conversation, a user of mobile phone 104 may send a text message from mobile phone 104, via interactions with head unit 102. For example, by operating the touchscreen of head unit 102, a user may initiate a text message to be sent to another device such as another mobile phone (not shown). The user of mobile phone 104 may select an option on the display 107 of head unit 102, and may thereby enter a text message mode. The text message mode presented by head unit 102 may present a display that is similar to the display that appears on mobile phone 104 when sending a text message therefrom. That is, the display 107 of head unit 102 may present a screen image on head unit 102 that is the same or similar to that which a user of mobile phone 104 would see if they were interacting directly with mobile phone 104 to send and/or receive a text message. When prompted to begin a new text message, the display may present a blank text message, into which the user may enter information designating a recipient of the text message, as well as the body of the message. The user may also be presented with the option of adding an attachment to the text message, depending upon the capabilities of the mobile phone 104 to which head unit 102 is communicatively linked, at the time. The user may then press a "send" button on the screen of head unit 102, and may thereby send the text message. Head unit 102 may then transmit the entered information to mobile phone 104, which may then transmit the information as a text message to the desired recipient. In a manner similar to the text message scenario described herein, email may be sent and/or received via the link between head unit 102 and mobile phone 104.

In an alternative embodiment, the text message information entered by the user may be transmitted "as entered" from head unit 102 to mobile phone 104, in an interactive, real-time manner. That is to say, head unit 102 may either store the entered information and transmit it all at once, may transmit it periodically as data is entered (e.g. in batches) or it may transmit it in real-time, as it is entered, or any other manner appropriate for a given situation, application, or device. When the recipient of the text message responds, mobile phone 104, while communicatively linked the head unit 102 as described above, may present the text message response on the display of head unit 102. In this manner, as with the phone call previously described, head unit 102 may serve as something of a dumb terminal or proxy to receive user input, transmit the user input to mobile phone 104, and receive responses from mobile phone 104, and present the responses, as previously described herein.

Likewise, using the examples above, a user may want to conduct an internet session via a web browser of mobile phone 104. The user may open a web session by interacting with head unit 102, which may convey/receive information to/from mobile phone 104, and may present said information on display 107 such that the user may browse the internet indirectly via mobile phone 104, by way of direct interaction with head unit 102.

In an embodiment, access to any/all of the assets of one mobile device may be provided to another mobile device, when in a communicatively linked arrangement as described herein. For example, when head unit 102 is communicatively linked to mobile phone 104, the contact list (e.g. address book) of mobile phone 104 may be available to head unit 102. By selecting an option or operation on head unit 102, the contact list stored on or otherwise maintained by mobile phone 104 may appear on the display 107 of head unit 102, for use by a user. A user may, for example, open the address book of mobile phone 104 by selecting an appropriate option on the display of head unit 102. Head unit 102 may then directly access the address book of mobile phone 104, without the need for copying and/or syncing the address book. In this manner, the task of making duplicate copies of the address book is avoided, as access to the address book by head unit 102 is done directly. In this manner, any/all assets (e.g. stored information or such) of one communicatively linked mobile device may be accessed by another in a manner that reduces complexity and redundancy. Via direct access to the assets (e.g. the address book) of mobile phone 104, head unit may facilitate phone calls, text messaging, emailing, and such, by permitting a user of head unit 104 to select recipients directly from the address book of mobile phone 104, without having to enter the relevant information manually. This may provide an improved user experience.

In an embodiment, any form or fashion of operation that may be conducted by one mobile device may be facilitated by a communicatively linked second mobile device, using the teachings of the present disclosure.

In an embodiment, any mobile device may be communicatively linked to any other mobile device or to any number of mobile devices. In a given situation, any of the mobile devices may perform any of the functions and/or roles of another mobile device, as may be appropriate in a given situation or circumstance. For example, it may be appropriate and/or preferable in a given situation to have one mobile device perform functions of another, yet reverse the roles in another situation, as the assets and or appurtenances of one device may serve a function or functions better than those of the other. In an embodiment, roles may be switched at any appropriate time for any duration, as may be appropriate in a give situation, and may be switched dynamically, even as operations are underway.

In an embodiment, data and/or information may be communicated back and forth between communicatively linked mobile devices in any appropriate form, as may be suitable in a given application. For example, information may be exchanged in image format, hypertext markup language (HTML), streaming data, packets of data and/or information, or any other means that may sufficiently and/or appropriately provide communication between the two devices to accomplish a given task. In addition, device input/output may be communicated between devices in a variety of manners. For example, touchscreen input on one device may be communicated to another device via (x,y) coordinates that may specify a location on the screen of one device. This data may then be translated by a second device by relating the coordinates to a position on the screen of the second device. Alternatively, (x,y) coordinates may be translated into other formats that may indicate a key on a keypad of the second device. As one of ordinary skill in the art would appreciate, input/output data may be communicated and/or translated in a variety of manners, all of which are anticipated by the present disclosure.

Figure 3:
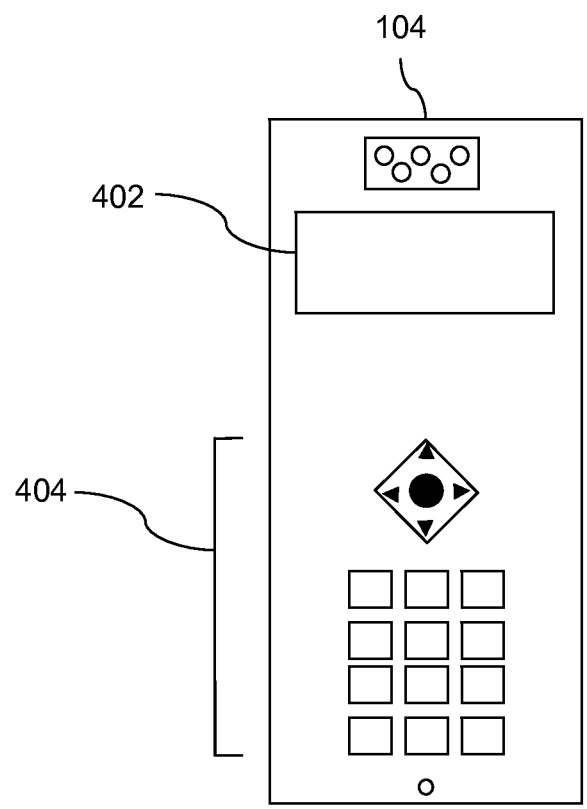
FIG. 3 illustrates a handheld mobile device, according to an embodiment of the disclosure.

FIG. 3 shows a mobile device 104. Mobile device 104 is operable for implementing aspects of the present disclosure, but the present disclosure should not be limited to these implementations. Though illustrated as a mobile phone, the mobile device 104 may take various forms including a wireless handset, a head unit, a pager, a personal digital assistant (PDA), a gaming device or a media player. The mobile device 104 includes a display 402 and a touch-sensitive surface and/or keys 404 for input by a user. The mobile device 104 may present options for the user to select, controls for the user to actuate, and/or cursors or other indicators for the user to direct. The mobile device 104 may further accept data entry from the user, including numbers to dial or various parameter values for configuring the operation of the handset. The mobile device 104 may further execute one or more software or firmware applications in response to user commands. These applications may configure the mobile device 104 to perform various customized functions in response to user interaction. Additionally, the mobile device 104 may be programmed and/or configured over-the-air, for example from a wireless base station, a wireless access point, or a peer mobile device 104.

The mobile device 104 may execute a web browser application which enables the display 402 to show a web page. The web page may be obtained via wireless communications with a base transceiver station (BTS) 108, a wireless network access node, a peer mobile device 104 or any other wireless communication network or system.

Figure 4:
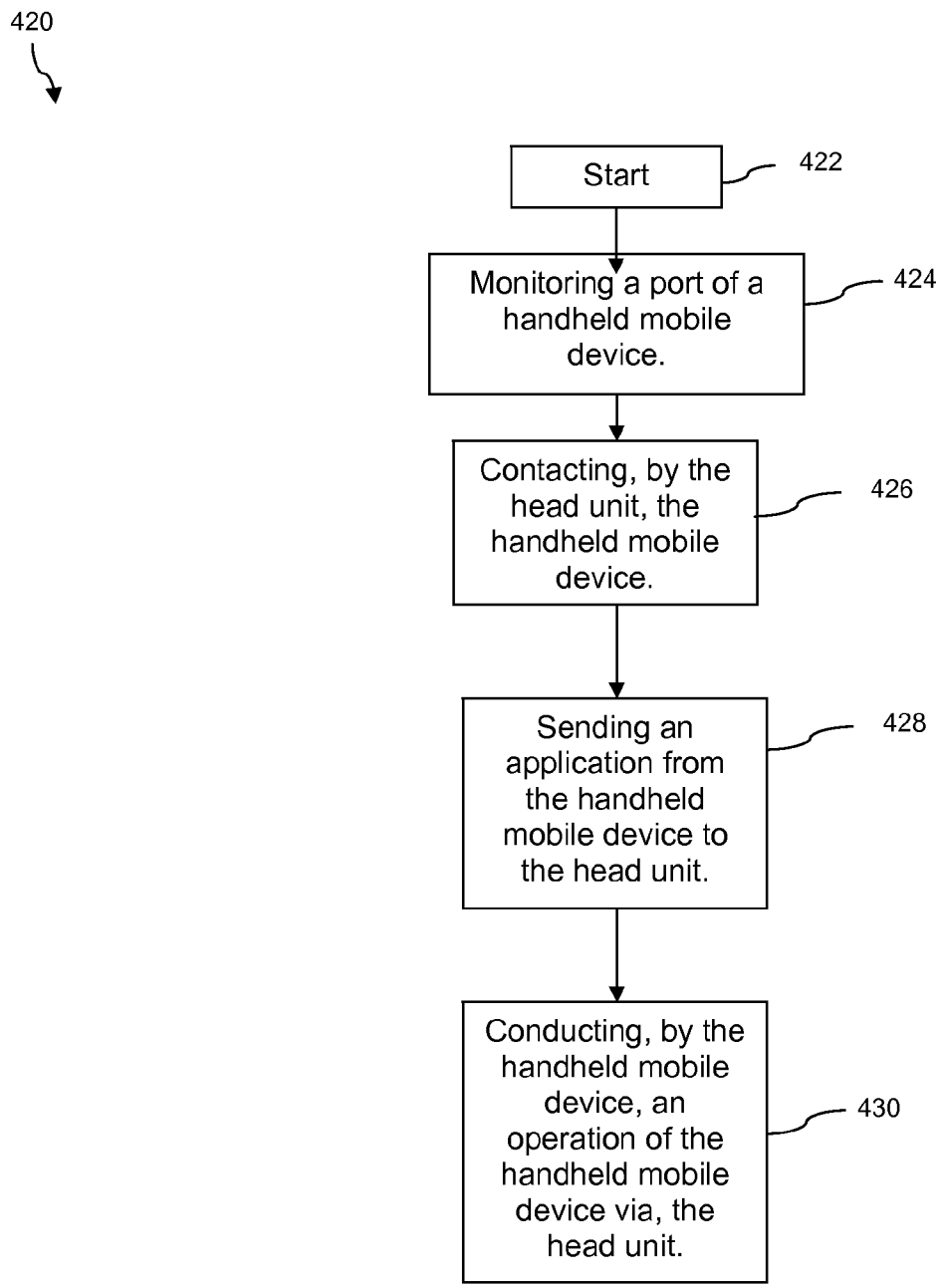
FIG. 4 illustrates a flowchart of a communicative coupling method, according to an embodiment of the disclosure.

FIG. 4 illustrates a method 420. At step 422, method 420 begins. At step 424, a handheld mobile device monitors one of its ports. The mobile device, such as mobile phone 104, may have one or more ports, as described in greater detail, herein above. The monitoring may be an ongoing or background process of mobile phone 104, such that the mobile phone 104 periodically, constantly, or intermittently monitors a port or ports of mobile phone 104, as part of normal operations. Alternatively, port monitoring may be invoked by an action of a user of mobile phone 104. For example, a user of mobile phone 104 may make a selection in a menu of mobile phone 104 or operate a button of mobile phone 104, in order to initiate the port monitoring. The monitoring may be referred to as "listening", in some contexts.

At step 426, the head unit, such as head unit 102, contacts mobile phone 104. The contacting may be any form of contacting, such as initiating a connection or link, as in a WiFi, NFC, or other form of wireless connection. As a result of the contacting, a communicative link may be established between head unit 102 and mobile phone 104.

In step 428, mobile phone 104 sends an application to head unit 102. The application may be, for example, a user interface application such as a graphical user interface application. The application may comprise instructions for encoding audio and/or data information in a format suitable for receiving and transmitting the information by the mobile phone 104. When executed by head unit 102, the application may enable head unit 102 to emulate mobile phone 104, such that mobile phone 104 may be, in essence, operated from head unit 102. In an embodiment, a display of head unit 102 may present a graphical representation of mobile phone 104, and may provide the ability for a user to, in effect, operate mobile phone 104 via head unit 102.

At step 430, by virtue of executing the application described herein above, head unit 102 may conduct the operation of mobile phone 104. For example, a user may initiate a phone call by depressing the phone buttons that appear on the representations of mobile phone 104 shown on the display of head unit 102. When the phone number is entered, either as each button is operated, or after all numbers are entered and a "send" button is operated, head unit 102 may wirelessly transmit the phone number to mobile phone 104, via the communicative link between head unit 102 and mobile phone 104. Mobile phone 104 may then, via technology that is well known, place the phone call. The phone call may proceed by the user speaking out loud, such that an audio system within the vehicle that contains head unit 102 picks up the voice, relays it to head unit 102, which then transmits it to mobile phone 104 via the communicative link between head unit 102 and mobile phone 104.

Mobile phone 104 may then, via know technology conduct the phone call between the user and the party to whom the phone call was placed, with the head unit 102 providing the functionality of microphone and speaker. In this fashion, the user may use mobile phone 104, by way of head unit 102, and may thereby take advantage of the larger, more convenient display of head unit 102, the audio system of the vehicle which contains head unit 102, and possibly the external antenna 105 of the vehicle, which may provide improved signal handling capabilities as compared to the antenna of mobile phone 104.

Figure 5:
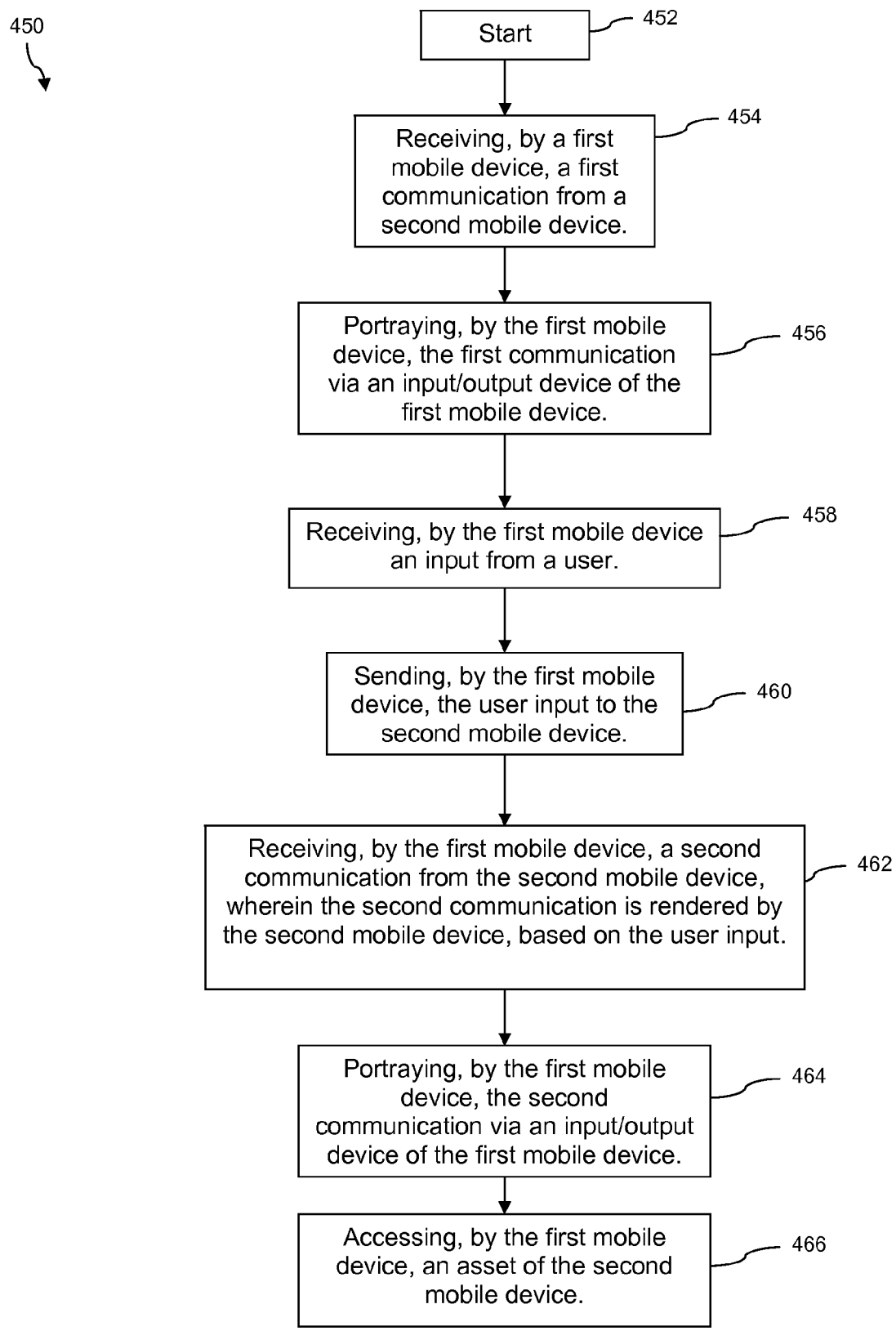
FIG. 5 illustrates a flowchart of a communicative coupling method, according to an embodiment of the disclosure.

FIG. 5 illustrates method 450. In step 452, the method begins. In step 454, a first mobile device (e.g. head unit 102) receives a communication from a second mobile device (e.g. mobile phone 104). The communication may be a phone call, a text message, an email, or any form of communication. In step 456, head unit 102 may portray the communication by, for example, projecting the voice of a caller of a phone call on an audio input/output device associated with head unit 102 or by displaying a text message on a display input/output device of head unit 102.

In step 458, head unit 102 may receive user input. A user may operate a button or touchscreen display of head unit 102 to, for example, place a phone call on hold. In step 460, head unit 102 may transmit the user input (e.g. the call hold operation) to mobile phone 104. In step 462, mobile phone 104 may receive the transmission of the hold button, and, in step 464 may render the operation by, for example, placing the phone call on hold. In step 464, once mobile phone 104 has placed the phone call on hold, head unit 102 may display an appropriate indication, such as by presenting a suitable message on the display of head unit 102 (e.g. "CALL ON HOLD").

In step 466, head unit 102 may be availed of an asset of mobile phone 104, such as the address book (e.g. contact list) of mobile phone 104. As opposed to requiring a synchronization of the address book of mobile phone 104 with an address book of head unit 102, or without the need to copy the address book of mobile phone over to head unit 102, head unit 102 may be permitted to directly access the address book of mobile phone 104. In an embodiment, any number of assets of mobile phone 104 may be accessible by head unit 102 while the communicative coupling between head unit 102 and mobile phone 104.

Figure 6:
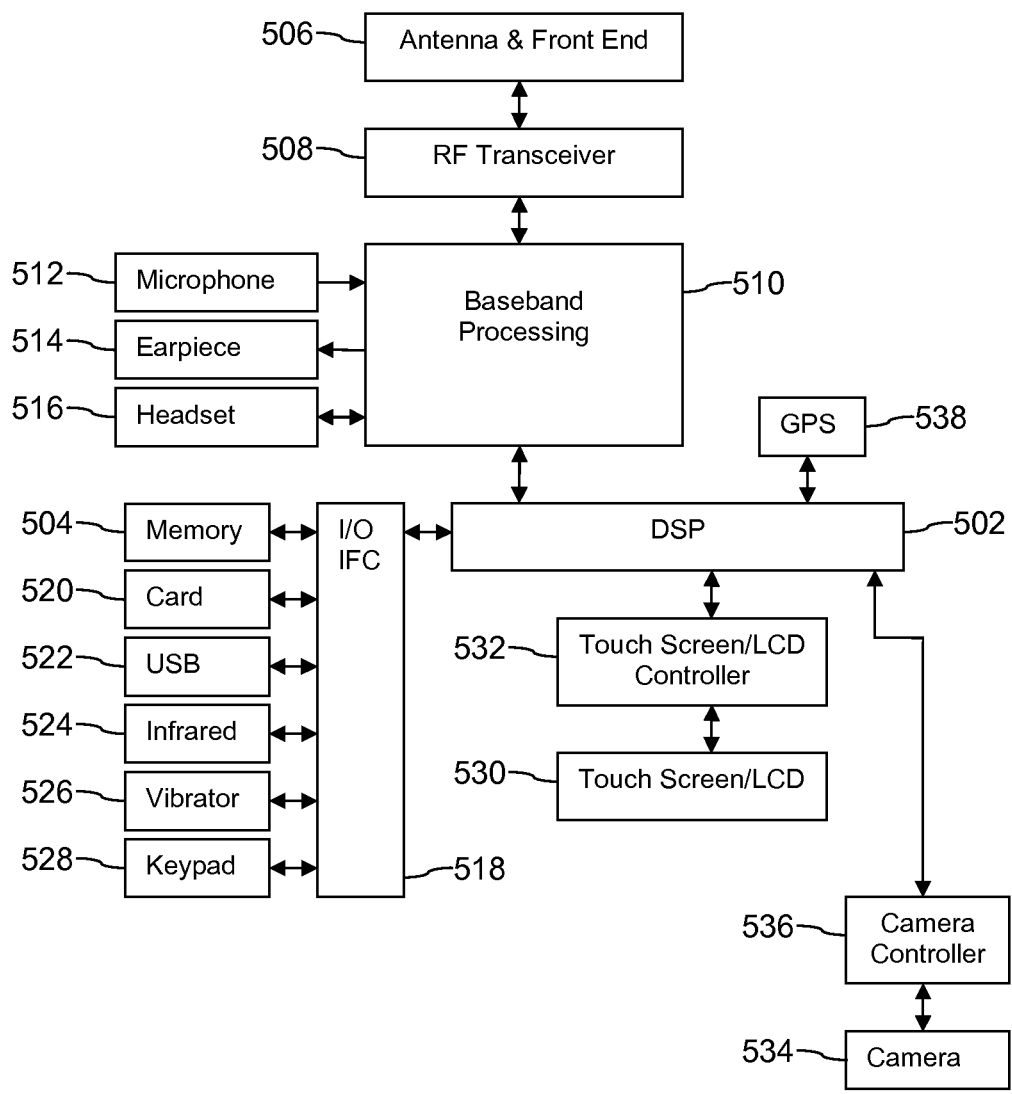
FIG. 6 illustrates a block diagram of a handheld mobile device, according to an embodiment of the disclosure.

FIG. 6 shows a block diagram of the mobile device 104. While a variety of known components of handsets are depicted, in an embodiment a subset of the listed components and/or additional components not listed may be included in the mobile device 104. The mobile device 104 includes a digital signal processor (DSP) 502 and a memory 504. As shown, the mobile device 104 may further include an antenna and front end unit 506, a radio frequency (RF) transceiver 508, an analog baseband processing unit 510, a microphone 512, an earpiece speaker 514, a headset port 516, an input/output interface 518, a removable memory card 520, a universal serial bus (USB) port 522, an infrared port 524, a vibrator 526, a keypad 528, a touch screen liquid crystal display (LCD) with a touch sensitive surface 530, a touch screen/LCD controller 532, a charge-coupled device (CCD) camera 534, a camera controller 536, and a global positioning system (GPS) sensor 538. In an embodiment, the mobile device 104 may include another kind of display that does not provide a touch sensitive screen. In an embodiment, the DSP 502 may communicate directly with the memory 504 without passing through the input/output interface 518.

The DSP 502 or some other form of controller or central processing unit operates to control the various components of the mobile device 104 in accordance with embedded software or firmware stored in memory 504 or stored in memory contained within the DSP 502 itself. In addition to the embedded software or firmware, the DSP 502 may execute other applications stored in the memory 504 or made available via information carrier media such as portable data storage media like the removable memory card 520 or via wired or wireless network communications. The application software may comprise a compiled set of machine-readable instructions that configure the DSP 502 to provide the desired functionality, or the application software may be high-level software instructions to be processed by an interpreter or compiler to indirectly configure the DSP 502.

The DSP 502 may communicate with a wireless network via the analog baseband processing unit 510. In some embodiments, the communication may provide Internet connectivity, enabling a user to gain access to content on the Internet and to send and receive e-mail or text messages. The input/output interface 518 interconnects the DSP 502 and various memories and interfaces. The memory 504 and the removable memory card 520 may provide software and data to configure the operation of the DSP 502. Among the interfaces may be the USB port 522 and the infrared port 524. The USB port 522 may enable the mobile device 104 to function as a peripheral device to exchange information with a personal computer or other computer system. The infrared port 524 and other optional ports such as a Bluetooth® interface or an IEEE 802.11 compliant wireless interface may enable the mobile device 104 to communicate wirelessly with other nearby handsets and/or wireless base stations.

The keypad 528 couples to the DSP 502 via the interface 518 to provide one mechanism for the user to make selections, enter information, and otherwise provide input to the mobile device 104. Another input mechanism may be the touch screen LCD 530, which may also display text and/or graphics to the user. The touch screen LCD controller 532 couples the DSP 502 to the touch screen LCD 530. The GPS sensor 538 is coupled to the DSP 502 to decode global positioning system signals, thereby enabling the mobile device 104 to determine its position.

Figure 7A:
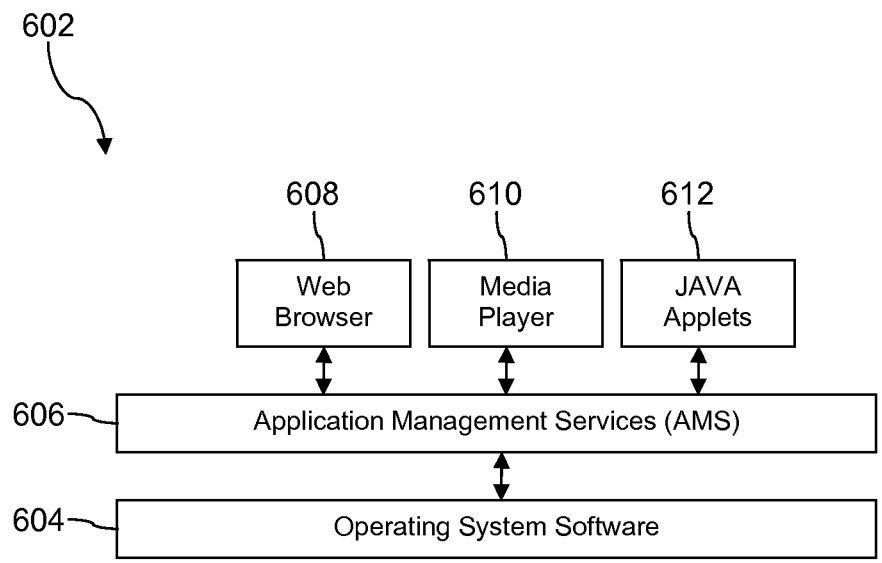
FIGS. 7a and 7b illustrate block diagrams of software environments, according to embodiments of the disclosure.

FIG. 7A illustrates a software environment 602 that may be implemented by the DSP 502. The DSP 502 executes operating system software 604 that provides a platform from which the rest of the software operates. The operating system software 604 may provide a variety of drivers for the handset hardware with standardized interfaces that are accessible to application software. The operating system software 604 may be coupled to and interact with application management services ("AMS") 606 that transfer control between applications running on the mobile device 104. Also shown in FIG. 7A are a web browser application 608, a media player application 610, and JAVA applets 612. The web browser application 608 configures the mobile device 104 to operate as a web browser, allowing a user to enter information into forms and select links to retrieve and view web pages. The media player application 610 configures the mobile device 104 to retrieve and play audio or audiovisual media. The JAVA applets 612 configure the mobile device 104 to provide games, utilities, and other functionality.

Figure 7B:
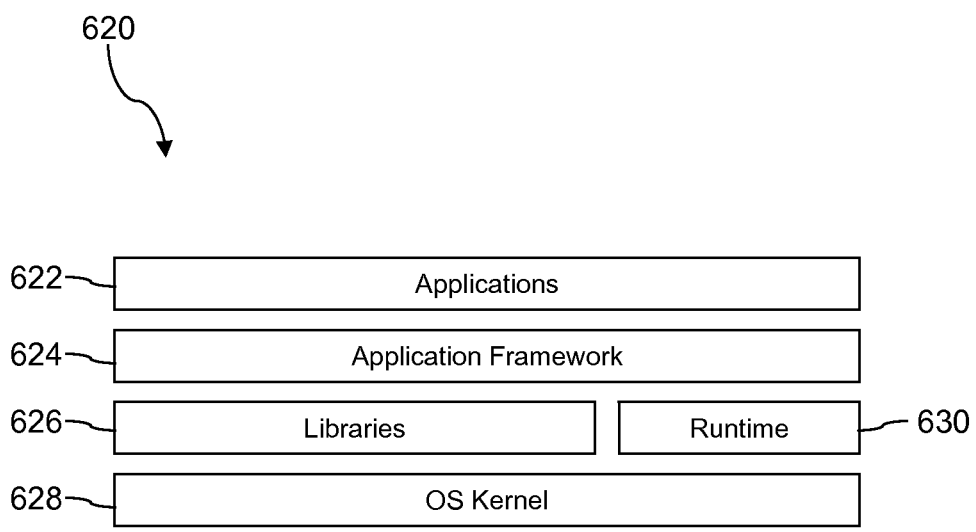

FIG. 7B illustrates an alternative software environment 620 that may be implemented by the DSP 502. The DSP 502 executes operating system software 628 and an execution runtime 630. The DSP 502 executes applications 622 that may execute in the execution runtime 630 and may rely upon services provided by the application framework 624. Applications 622 and the application framework 624 may rely upon functionality provided via the libraries 626.

Figure 8:
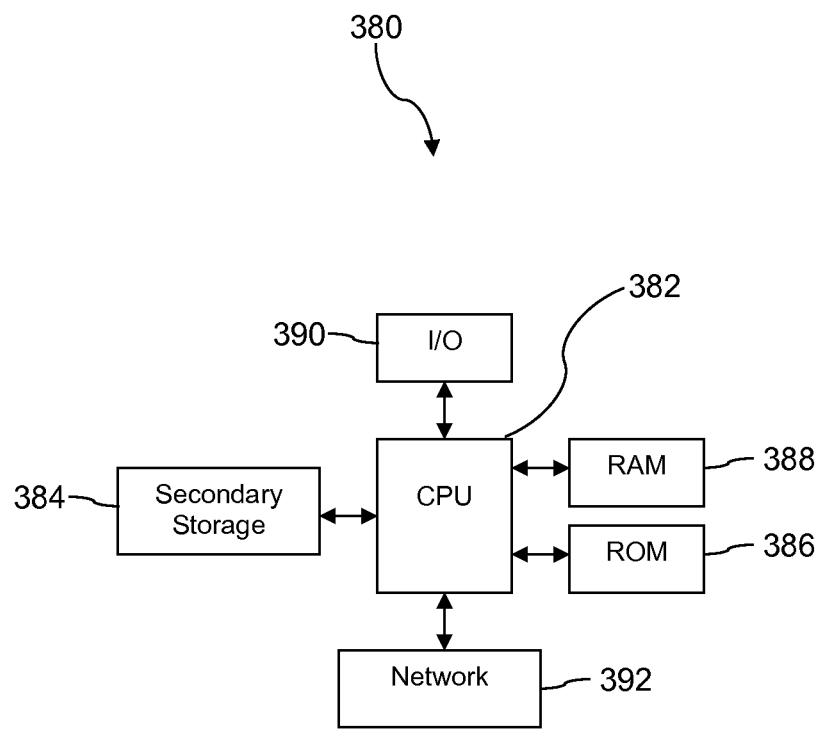
FIG. 8 illustrates a computer system suitable for implementing several embodiments of the disclosure.

FIG. 8 illustrates a computer system 380 suitable for implementing one or more embodiments disclosed herein. The computer system 380 includes a processor 382 (which may be referred to as a central processor unit or CPU) that is in communication with memory devices including secondary storage 384, read only memory (ROM) 386, random access memory (RAM) 388, input/output (I/O) devices 390, and network connectivity devices 392. The processor 382 may be implemented as one or more CPU chips.

It is understood that by programming and/or loading executable instructions onto the computer system 380, at least one of the CPU 382, the RAM 388, and the ROM 386 are changed, transforming the computer system 380 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 384 is typically comprised of one or more disk drives or tape drives and is used for non-volatile storage of data and as an over-flow data storage device if RAM 388 is not large enough to hold all working data. Secondary storage 384 may be used to store programs which are loaded into RAM 388 when such programs are selected for execution. The ROM 386 is used to store instructions and perhaps data which are read during program execution. ROM 386 is a non-volatile memory device which typically has a small memory capacity relative to the larger memory capacity of secondary storage 384. The RAM 388 is used to store volatile data and perhaps to store instructions. Access to both ROM 386 and RAM 388 is typically faster than to secondary storage 384. The secondary storage 384, the RAM 388, and/or the ROM 386 may be referred to in some contexts as computer readable storage media and/or non-transitory computer readable media.

I/O devices 390 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 392 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 392 may enable the processor 382 to communicate with the Internet or one or more intranets. With such a network connection, it is contemplated that the processor 382 might receive information from the network, or might output information to the network in the course of performing the above-described method steps. Such information, which is often represented as a sequence of instructions to be executed using processor 382, may be received from and outputted to the network, for example, in the form of a computer data signal embodied in a carrier wave.

Such information, which may include data or instructions to be executed using processor 382 for example, may be received from and outputted to the network, for example, in the form of a computer data baseband signal or signal embodied in a carrier wave. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 382 executes instructions, codes, computer programs, scripts which it accesses from hard disk, floppy disk, optical disk (these various disk based systems may all be considered secondary storage 384), ROM 386, RAM 388, or the network connectivity devices 392. While only one processor 382 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 384, for example, hard drives, floppy disks, optical disks, and/or other device, the ROM 386, and/or the RAM 388 may be referred to in some contexts as non-transitory instructions and/or non-transitory information.

In an embodiment, the computer system 380 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 380 to provide the functionality of a number of servers that is not directly bound to the number of computers in the computer system 380. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein to implement the functionality disclosed above. The computer program product may comprise data structures, executable instructions, and other computer usable program code. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 380, at least portions of the contents of the computer program product to the secondary storage 384, to the ROM 386, to the RAM 388, and/or to other non-volatile memory and volatile memory of the computer system 380. The processor 382 may process the executable instructions and/or data structures in part by directly accessing the computer program product, for example by reading from a CD-ROM disk inserted into a disk drive peripheral of the computer system 380. Alternatively, the processor 382 may process the executable instructions and/or data structures by remotely accessing the computer program product, for example by downloading the executable instructions and/or data structures from a remote server through the network connectivity devices 392. The computer program product may comprise instructions that promote the loading and/or copying of data, data structures, files, and/or executable instructions to the secondary storage 384, to the ROM 386, to the RAM 388, and/or to other non-volatile memory and volatile memory of the computer system 380.

In some contexts, the secondary storage 384, the ROM 386, and the RAM 388 may be referred to as a non-transitory computer readable medium or a computer readable storage media. A dynamic RAM embodiment of the RAM 388, likewise, may be referred to as a non-transitory computer readable medium in that while the dynamic RAM receives electrical power and is operated in accordance with its design, for example during a period of time during which the computer 380 is turned on and operational, the dynamic RAM stores information that is written to it. Similarly, the processor 382 may comprise an internal RAM, an internal ROM, a cache memory, and/or other internal non-transitory storage blocks, sections, or components that may be referred to in some contexts as non-transitory computer readable media or computer readable storage media.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of communicatively coupling a handheld mobile device and a head unit device comprising:
   monitoring, by the handheld mobile device, a port of the handheld mobile device;
   establishing a communicative link between the handheld mobile device and the head unit device, wherein establishment of the communicative link does not create a duplicate copy of an asset of the handheld mobile device on the head unit device, and wherein the asset of the handheld mobile device comprises an address book;
   sending, by the handheld mobile device, an application that comprises a graphical user interface to the head unit device via the communicative link when the head unit device contacts the handheld mobile device via the port of the handheld mobile device, wherein the application executes on the head unit device to present the graphical user interface on the head unit device, and wherein the graphical user interface is analogous in appearance of display of a graphical user interface of the handheld mobile device;
   conducting, by the handheld mobile device, an operation of the handheld mobile device using the head unit device as a user interface for the handheld mobile device; and
   accessing directly, by the head unit device via the communicative link, the asset of the handheld mobile device that is stored on the handheld mobile device without the need for synchronizing and copying the asset of the handheld mobile device to the head unit device.

2. The method of claim 1, wherein the handheld mobile device initiates the communicative coupling by contacting the head unit device.

3. The method of claim 1, wherein the head unit device initiates the establishment of the communicative link by contacting the handheld mobile device.

4. The method of claim 1, wherein the head unit device is a computer.

5. The method of claim 1, wherein the operation of the handheld mobile device is one or more of a phone call, a text message, an email, or a web session, and wherein the asset of the handheld mobile device further comprises a history of the mobile communication device.

6. The method of claim 1, wherein conducting the operation of the handheld mobile device using the head unit device comprises sending and receiving user input between the handheld mobile device and the head unit device.

7. The method of claim 6, wherein conducting the operation of the handheld mobile device by the head unit device further comprises presenting information of the operation of the handheld mobile device by the head unit device.

8. The method of claim 1, further comprising deleting, from the head unit, the application executing on the head unit.

9. A system for linking communication devices comprising:
- a mobile communication device comprising:
    - a processor;
    - a transceiver;
    - a memory;
    - an application stored in the memory that is operable to:
        - monitor a port of the mobile communication device,
        - establish a communicative link between the mobile communication device and a head unit device, wherein establishment of the communicative link does not create a duplicate copy of an asset of the mobile communication device on the head unit device, and wherein the asset of the mobile communication device comprises an address book,
        - send a user interface application that comprises a graphical user interface to the head unit device when the head unit device communicatively links with the mobile communication device via the port, wherein the graphical user interface is analogous in appearance to a graphical user interface of the mobile communication device, and
        - conduct an operation of the mobile communication device by the mobile communication device using a user interface of the head unit device, wherein the asset that is stored on the mobile communication device is accessed directly by the head unit device without the need for the head unit device to synchronize and copy the asset of the mobile communication device to the head unit device.

10. The system of claim 9, wherein conducting the operation of the mobile communication device using the head unit device comprises receiving user input on the head unit device.

11. The system of claim 10, wherein conducting the operation of the mobile communication device using the head unit device further comprises communicating the user input on the head unit device to the mobile communication device.

12. The system of claim 11, wherein conducting the operation of the mobile communication device using the head unit device further comprises presenting information of the operation of the mobile communication device by the mobile communication device.

13. The system of claim 9, wherein the operation of the mobile communication device is one or more of a phone call, a text message, an email, or a web session.

14. The system of claim 9, wherein the asset of the mobile communication device further comprises a history of the mobile communication device.

15. A method for linking communication devices comprising:
- communicatively linking a head unit device with a mobile communication device, wherein the linking does not cause duplicate storage of an asset of the mobile communication device on the head unit device, and wherein the asset of the mobile communication device comprises an address book;
- receiving, by the head unit device, an application that comprises a graphical user interface from the mobile communication device, wherein the graphical user interface is analogous in appearance to a graphical user interface of the mobile communication device;
- receiving, by the head unit device, a first communication from the mobile communication device;
- portraying, by the head unit device, the first communication using an input/output unit of the head unit device;
- receiving, by the head unit device, an input from a user;
- sending, by the head unit device, the user input to the mobile communication device;
- receiving, by the head unit device, a second communication from the mobile communication device, wherein the second communication is rendered by the mobile communication device, based on the user input;
- portraying, by the head unit device, the second communication using an I/O device of the head unit device; and
- accessing directly, by the head unit device, the asset of the mobile communication device that is stored on the mobile communication device without the need for synchronizing and copying the asset of the mobile communication device to the head unit device.

16. The method of claim 15, wherein the first and the second communications comprise one or more of voice information, text information, data, x-y coordinates, hypertext markup language (HTML), or an image.

17. The method of claim 15, wherein the first and the second communications comprise one or more of WiFi communications or near-field communications (NFC).

18. The method of claim 15, wherein the asset of the mobile communication device further comprises a history of the mobile communication device.

19. The method of claim 15, wherein the I/O device is one or more of a visual display, an audio system, or a storage device.

20. The method of claim 15, wherein the first and second communications are one or more of a phone call, a voice mail message, an email, a text message, or a web browser session.

* * * * *